July 24, 1934.  G. E. EDMUNDS ET AL  1,967,354
COUPLING
Filed April 10, 1933
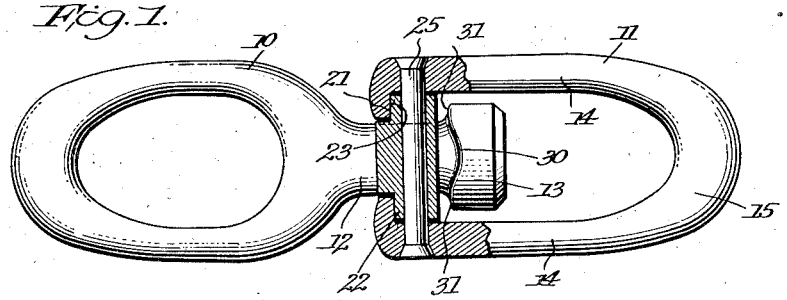
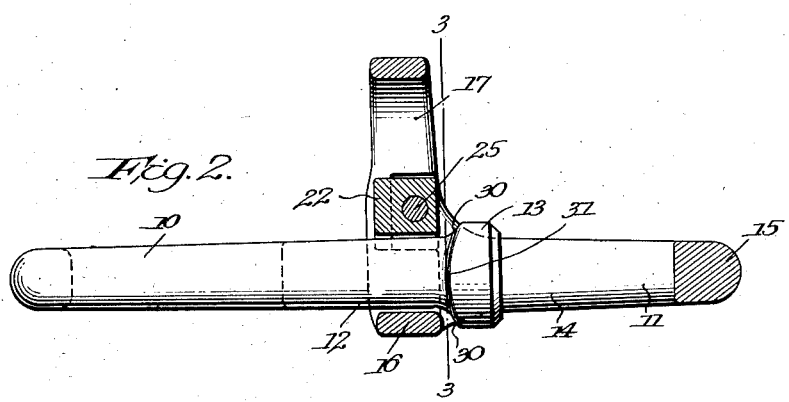
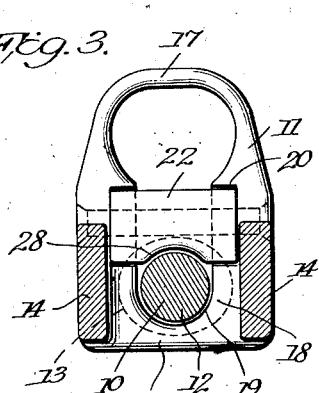
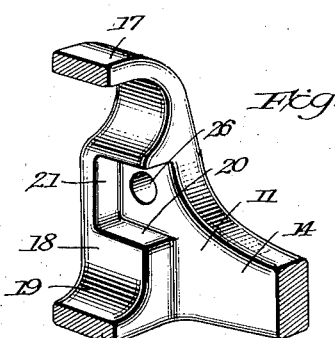
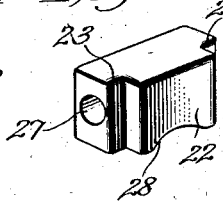
Inventors
Glenn E. Edmunds,
Walter B. Floyd, Patented July 24, 1934

1,967,354

UNITED STATES PATENT OFFICE 1,967,354

COUPLING

Glenn E. Edmunds and Walter B. Floyd, Columbus, Ohio, assignors to The Bonney-Floyd Company, Columbus, Ohio, a corporation of Ohio Application April 10, 1933, Serial No. 665,453

3 Claims. (Cl. 213—210)

The present invention relates to a coupling and, more particularly, a coupling for mine cars.

Mine car couplings are usually formed of two eye or link members joined together in a manner to permit the two members to have a certain degree of relative movement with respect to each other. The ordinary manner of connecting the two eye or link members together is to join their adjacent ends by means of a longitudinally extending rivet or bolt, thus providing a swivel connection between the eye members. In a coupling of this usual type, the longitudinally extending bolt or rivet which holds the two eye members in swiveled relation with respect to each other bears the entire pulling strain and breakage frequently occurs at this point.

Another disadvantage of the prior art coupling of the swivel type results from the fact that the two eye or link members can have no vertical movement with respect to each other. Because the two eye members are joined together by a horizontally or longitudinally extending bolt or rivet, they may only have turning movement with respect to each other.

The principal object of the present invention is to provide a coupling wherein all of the strain between the two members of the coupling will be exerted upon the body portion of the two coupling members, rather than upon a rivet. This object is preferably attained by providing a coupling wherein one of the members is provided with spaced shoulders between which a shank formed integrally with the other member is adapted to be positioned, the shank being provided with an enlarged head which bears upon the inner faces of the shoulders. A key or block element is preferably provided to extend between the two shoulders on the one member to hold the shank of the other member between the shoulders. The key may be held in position between the shoulders by means of a bolt or rivet, but the device is so constructed that the rivet or bolt does not have any pulling action exerted thereon but merely serves to hold the key in position. By this arrangement, all strain will be exerted upon and between the body portions of the link or eye members rather than upon a rivet or bolt of much less strength than the link members themselves.

Still another object of the invention is to provide a coupling wherein the two link or eye members have longitudinal movement with respect to each other. In the swivel type of coupling, the eye members have no longitudinal movement with respect to each other and this is naturally a disadvantage in attempting to couple cars together. The coupling of our invention is so designed that the two eye members have longitudinal movement with respect to each other and can, therefore, be used to couple cars spaced over a greater range of distances than can ordinarily be accommodated by the usual couplings.

Another object of the invention is to provide a coupling wherein the two eye or link members may have vertical movement with respect to each other. This object is achieved by so forming the head of the shank carried by one of the eye members that the head may rock with respect to the shoulders on the other member.

It is obvious that a coupling wherein the two eye members have longitudinal movement with respect to each other as well as vertical movement may be more readily used to couple cars together than a coupling which lacks these advantages. This is particularly true in a coupling used for mine cars since the tracks upon which the cars operate are frequently not laid upon a perfectly level track bed, with the result that the adjacent ends of two cars may be inclined with respect to each other.

Another object of the invention is to provide a coupling of this type which is provided with a handle to permit the coupling to be more readily moved about by the operator and with less danger of injury to the operator.

Other objects and advantages of the invention will be apparent from the following drawing wherein:

Figure 1 is a plan elevation of our coupling, portions of the coupling being shown in horizontal section.

Figure 2 is a side elevation of the coupling showing one of the link or eye members in vertical section.

Figure 3 is a vertical sectional view taken on the line 3—3 of Figure 2.

Figure 4 is a fragmentary perspective view of one of the eye members, and

Figure 5 is a perspective view of the locking key or block which may be used with our invention.

The numerals 10 and 11 respectively indicate the link or eye members of the coupling. The member 10 is in the form of a closed link or eye and is provided with a shank 12 extending from one end thereof, the shank having an annular flange or enlarged head 13 at its outer end. The member 11 is substantially U-shaped and includes two arms 14. However, the ends of the arms 14 opposite from the bight portion 15 are joined by an integral strap portion 16. These ends of the arms 14 are also preferably bridged and joined by a handle portion 17, as shown in Figures 2 and 3. As best shown in Figures 3 and 4, the ends of the arms 14 adjacent the strap 16 include inwardly extending shoulders 18 which extend upwardly along the vertical arms of the handle 17.

The strap portion and the inwardly extending shoulders 18 are so shaped, as shown in Figure 3, that an arcuate seat 19 is formed for the shank 12 of the link or eye member 10. The shoulders 18 are provided with cut-outs or kerfs 20 which are closed by walls 21. A block or key member 22, illustrated in detail in Figure 5, is adapted to have its ends positioned in the kerfs 20. The position of the block or key 22 when seated in the kerfs 20 will be the reverse of that shown in Figure 5 in order that shoulders 23 provided on the key or block member will contact with the walls 21 of the kerfs 20 and the upper and lower end surfaces of the block will contact with the upper and lower walls of the kerfs. A rivet or bolt 25 extends through apertures 26 in the handle portion 17 and through an aligned aperture 27 in the key or block 22, thereby holding the latter in position.

The key or block 22 serves to hold the link or eye members 10 and 11 of the coupling in proper position. The removal of the key or block 22 will allow the members 10 and 11 to be separated, the separation being effected by raising the eye member 10 and its shank upwardly between the shoulders 18 and moving the head 13 outwardly through the space within the handle 17 and above the shoulders 18.

It will be observed that the lower surface of the key or block 22 is preferably indented, on an arcuate line, at 28 in order that it may conform to the shape of the shank 12 which rests in the seat 19.

By the arrangement described above, the eye members 10 and 11 will have longitudinal movement with respect to each other, this movement being limited by engagement of the eye portion of the eye member 10 or the head 13 of the shank 12 with the shoulders 18. The space bounded by the side walls of the seat 19 and the arcuate surface 28 of the key or block member 22 is such that the shank 12 may have a certain degree of swinging movement therein. In order that this movement may not be limited when the two eye members are in longitudinally extended position with respect to each other, the inner side of the head 13 is indented at diametrically opposite portions 30, these indented portions 30 being those which will be at the upper and lower sides of the head and shank when the coupling is connected between two cars so that the two eye members lie substantially in a horizontal plane as shown in Figure 1. It will be obvious that in such a position the two members may move vertically with respect to each other, the projecting surfaces 31 of the head 13 then bearing and rocking on the inwardly projecting shoulders 18 of the member 11.

When the key or block 22 is in position, no pulling strain is exerted upon it for the reason that the block 22 is positioned somewhat above the points on the shoulders 18 against which the projecting surfaces 31 of the head will bear. Even when the shank 12 is in the extreme upper and lower positions which it may occupy in the seat 19, the projecting portions 31 on the head 13 will bear against the shoulders 18. The seat 19 and block 22 thus limit both the vertical and horizontal declination between the members 10 and 11, as stated above.

This construction insures that none of the pull will be exerted upon the rivet or bolt 25 because when straight, normal pull is exerted upon the coupling, the head 13 will not bear upon the block 22. Any strain caused by bending will be transmitted through the block 22 to the walls of the kerfs 20 and to the front or rear of the strap 16.

When our coupling is used on cars with very short bumpers and the cars are pushed, the members 10 and 11 will move together. In such a position, the body portion of the eye member 10 will come in contact with the shoulders 18 on the eye member 11 so that even in this position, no strain will be exerted on the block 22 and the rivet or bolt 25.

It will be obvious that by the construction provided, the two eye members may be moved longitudinally or turned with respect to each other to permit the ready coupling of cars. Also, since all of the pull or stress to which the members are subjected is transmitted directly to the bodies of the members, the possibilities of breakage will be greatly decreased. The handle 17 will enable the coupling to be moved about by an operator without exposing his hand between the link members 10 and 11 in case the coupling should be struck by movement of the cars being coupled.

It will be understood that the invention is not limited to the form shown in the drawing and described in the specification and that the example of the use of the device which has been given does not include all of the uses of which the device is capable; also, that the phraseology employed in the specification is for the purpose of description and not of limitation.

We claim:

1. A coupling comprising a pair of link members, one of said link members being provided with a shank having an enlarged head, the other of said link members being provided with spaced upstanding shoulders, the shank of said first-mentioned link member being positioned between said shoulders with the head thereof adapted to contact with the inner walls of the shoulders, a key upon said shoulders, and means to lock said key between said shoulders, said key bearing upon an upward extension of said shoulders, said head being cut away at its upper and lower portions to permit the link members to have vertical movement with respect to each other.

2. A coupling comprising two link members, one of said link members being provided with a shank, a head on said shank, the other of said link members including a relatively low end wall, spaced shoulders projecting upwardly from said end wall, said shoulders being recessed on their inner faces, the shank of said first named link member being positioned between said shoulders and beneath the recesses with the head thereof adapted to bear upon said shoulders, and a key member positioned in the recesses and extending between the shoulders, the surface of said head positioned opposite said low end wall and said key being cut away to permit said link members to have vertical movement with respect to each other.

3. A coupling comprising a pair of link members, one of said link members being provided with a shank having an enlarged head element, the other of said link members being provided with spaced upstanding shoulder elements, the shank of said first-mentioned link member being positioned between said shoulder elements, the head element of the shank being provided with surfaces adapted to contact with the inner surfaces of said shoulder elements, the surfaces of one of said elements being convex and the surfaces of the other of said elements being substantially flat so that the link members may rock with respect to each other.

GLENN E. EDMUNDS.
WALTER B. FLOYD.